United States Patent Office 2,741,656
Patented Apr. 10, 1956

2,741,656

MANUFACTURE OF ACID AMIDE DERIVATIVES OF AZO-COMPOUNDS

Max Schmid, Riehen, Eduard Moser, Basel, Jakob Danuser, Arlesheim, Rudolf Mory, Binningen, Willy Mueller, Riehen, and Jakob Wuergler, Neuewelt, near Basel, Switzerland, assignors to Ciba Limited, Basel, Switzerland, a Swiss firm No Drawing. Application February 25, 1952,
Serial No. 273,364

Claims priority, application Switzerland March 2, 1951

12 Claims. (Cl. 260—160)

According to this invention valuable acid amide derivatives of azo-dyestuffs are made by reacting a non-vattable amine with a halide of a carboxylic acid, which contains at least one carboxyl group, at least one azo group separated from the carboxyl group by more than one carbon atom, and a hydroxyl group in a position vicinal to the azo group.

The acid halides used as starting materials in the present process can be made by treating with an agent suitable for producing acid halides, an azo-compound, which contains at least one carboxyl group, at least one azo group separated from the carboxyl group by more than one carbon atom, and a hydroxyl group in a position vicinal to the azo group.

The carboxylic acid containing azo groups and used as starting materials for making the acid halides, may contain one or two, and if desired more than two, carboxyl groups. They must also contain at least one azo group, which must be separated from a carboxyl group by more than one carbon atom, that is to say, the azo group must not be bound to the same carbon atom as the carboxyl group. Finally, the starting materials must contain a hydroxyl group in a position vicinal to an azo group. This latter requirement is fulfilled, if in the production of the azo-dyestuff coupling has occurred in ortho-position to an aromatically bound hydroxyl group or at the —CH₂— group of an enolizable keto-methylene group bound in a heterocyclic ring or in an open chain, for as is known the dyestuffs so obtained are in the enol-form. There are advantageously used azo-carboxylic acids, which contain, apart from the carboxylic acid groups to be converted into acid halide groups, no groups imparting solubility such, for example, as sulfonic acid groups.

As types of such azo-carboxylic acids there may be mentioned, for example:

I. The products obtained by coupling any desired diazo- (including diazoazo)-compounds with hydroxyarylcarboxylic acids capable of coupling in ortho-position to the hydroxyl group, such as the dyestuffs of the formulae

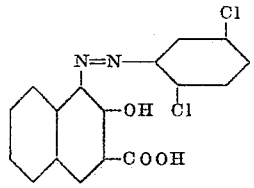

and

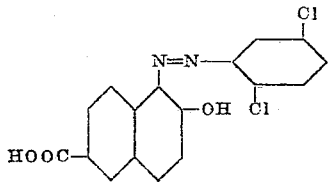

II. The products obtained by coupling diazo-compounds with heterocyclic carboxylic acids capable of coupling in ortho-position to an enolizable keto group, such as the dyestuffs of the formulae

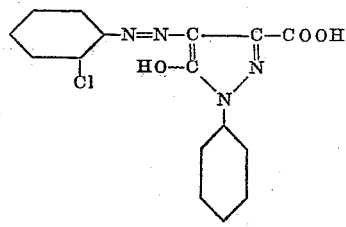

and

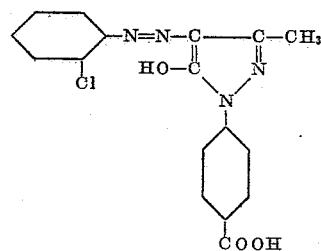

III. The products obtained by coupling any desired diazo-compounds with acylacetylaminoaryl-carboxylic acids, such as the dyestuffs of the formula

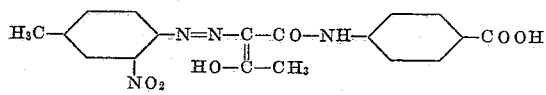

IV. The products obtained by coupling diazo-compounds containing carboxyl groups with any desired compounds capable of coupling in ortho-position with respect to an aromatic hydroxyl group or an enolizable keto group, such as the dyestuffs of the formulae

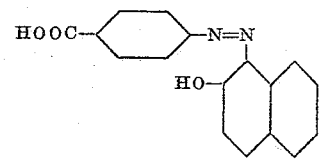

and

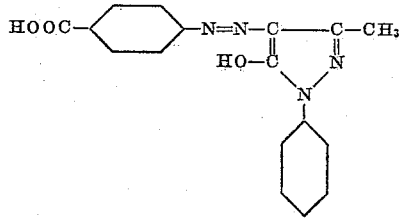

Further types can be obtained by combining the characteristics of different products of the aforesaid types or varying these characteristics in accordance with the foregoing general description. Such types are especially the dis- and poly-carboxylic acids containing azo groups.

Further information with regard to the individual types is given below.

With regard to Types I, II and III:

The diazo-compounds used for making such starting materials are, as already stated, advantageously so chosen that they are free from groups imparting solubility, for example, sulfonic acid groups. They may belong to the benzene or naphthalene series, or if desired, the diazo group may be bound to a polynuclear radical.

It is of advantage to use diazo-compounds which can also be used for producing ice colors. As examples there may be mentioned the following monamines containing only one benzene nucleus.

Monochloranilines, such as 2- or 3- or 4-chloraniline, aminobenzenes having various substituents, such as 2-methyl- or 2-methoxy-5-nitraniline, 2-methoxy-3-, -4-, -5- or -6-chloraniline, 2-nitro-4-chloro or -4-methyl- or -4-methoxyaniline, 2-methoxy-5-methylaniline, 2:5-dimethoxy-4-chloraniline, or 4-chloro-2:5-dimethylaniline. In an analogous manner there may also be used monamines of the benzene series, which contain more than one benzene nucleus, such as 2-amino-4:4'-dichlorodiphenyl ether, 2-aminodiphenylsulfone, 1-amino-2:5-dialkoxy-(especially methoxy or ethoxy)-4-benzoylamino-benzene, 1-amino-2-alkoxy-(for example methoxy)-4-benzoylamino-5-methylbenzene, amino-chrysene, amino-pyrene, 4-amino -2- methyl-5-methoxy-1-benzoylamino-benzene, 4-amino-2':3-dimethyl-1:1'-azo-benzene, 4-amino-2:5-dimethoxy-4'-nitro-2':6'-dichloro-1:1'-azobenzene, amino-diphenylamine or N-substitution products thereof. There also come into consideration amines containing trifluoromethyl groups, such as 4-chloro-2-trifluoromethyl-aniline, 3:5-di-(trifluoromethyl)-aniline, and 2-chloro-5-trifluoromethyl-aniline. Finally, the aforesaid amines may also contain alkyl-sulfone, aralkyl-sulfone or sulfonic acid amide groups, such as 2-methoxy-5-ethyl-sulfone-aniline, 2-methoxy-5-benzyl-sulfone-aniline, 2-methoxy-1-aminobenzene-5-sulfonic acid diethylamide and 2-ethyl-sulfone-5-trifluoromethyl-aniline.

For preparing the carboxylic acids containing azo groups, which are to be used as starting materials, they and other amines may be coupled with any carboxylic acids capable of coupling in a position vicinal to a hydroxyl group, for example, 2-hydroxynaphthalene-3-carboxylic acid, or hydroxy-carbazole-carboxylic acids, especially 2-hydroxycarbazole-3-carboxylic acid or N-alkyl derivatives thereof, 2 - hydroxy - anthracene - 3 - carboxylic acid, or 3 - hydroxy - diphenyleneoxide - 2 - carboxylic acids or 3-hydroxy-diphenylenesulfide-2-carboxylic acids. As coupling components there may also be used open chain or heterocyclic compounds having enolizable keto groups, it being generally supposed that after completion of the coupling they are present predominantly in the enol-form, that is to say, they contain a hydroxy group in a position vicinal to the azo linkage. As examples there may be mentioned pyrazolone carboxylic acids, for example, 1 - aryl - 5 - pyrazolone - 3 - carboxylic acids, or aryl-pyrazolones which contain a carboxyl group bound to the aryl radical; as examples there may be mentioned 1 - phenyl - 5 - pyrazolone - 3 - carboxylic acid and 1 - phenyl - 3 - methyl - 5 - pyrazolene - 4' - carboxylic acid, and also β-keto-carboxylic acid arylides containing carboxyl groups, in which the carboxyl group is not directly bound to the carbon atom at which coupling takes place such, for example, as 1-acetoacetylamino-benzene-2- or -3- or -4-carboxylic acid, and 1-benzoyl-acetylamino-benzene-3- or -4-carboxylic acid.

With regard to IV:

Carboxylic acids containing azo linkages of the kind hereinbefore referred to can also be obtained by coupling a diazotized aminoaryl-carboxylic acid with a coupling component capable of coupling in ortho-position to a hydroxyl group. As examples there may be mentioned aminobenzoic acids and their halogen, alkoxy and nitro derivatives, and also their alkyl-sulfones. Such diazo-compounds may be coupled with any desired compounds capable of coupling in a position vicinal to a hydroxyl group, such as 2-hydroxynaphthalene, phenols or 1-hydroxy-naphthalenes containing a substituent in the 4-position, 2- or 3-hydroxycarbazoles such as N-methyl-3-hydroxycarbazoles, or 3-hydroxy-diphenylene oxide.

Besides the monocarboxylic acids containing azo linkages described above there may be used as starting materials for making the acid halides compounds which contain more than one carboxyl group. Such compounds may be made by coupling any desired diazo-compounds with dicarboxylic acids capable of coupling or by coupling diazo-compounds containing two carboxyl groups with compounds capable of coupling, or more especially by coupling diazotized aminoaryl-carboxylic acids with compounds capable of coupling and containing carboxyl groups, for example, by coupling a diazotized aminobenzoic acid with 2:3-hydroxy-naphthoic acid, with a pyrazolone carboxylic acid or with a β-keto-carboxylic acid arylide which contains a carboxyl group in the arylide radical, with 4-methyl-1-hydroxybenzene-2-carboxylic acid or with α- or β-resorcylic acid.

Such carboxylic acids are treated with agents capable of forming acid halides. As such agents there are to be understood those which are capable of converting carboxylic acids into their acid halides, for example, their bromides or chlorides; there are especially suitable as such agents phosphorus halides, such as phosphorus pentabromide, phosphorus trichloride, phosphorus pentachloride or phosphorus oxy-halides. It is of advantage to use agents capable of producing the corresponding acid chlorides, such as phosphorus pentachloride or thionyl chloride.

The treatment with such halogenating agents is advantageously carried out in an inert organic solvent, such as a chlorobenzene, for example, mono- or di-chlorobenzene, toluene, xylene, benzene or nitrobenzene.

In preparing such acid halides it is generally of advantage first to dry the azo-compound produced in an aqueous medium or to free it from water by azeotropic distillation in an organic solvent. This azeotropic drying may, if desired, immediately precede the treatment with the halogenating agent.

In accordance with the process of the invention the acid halides so obtained are reacted with primary or secondary non-vattable amines.

For this purpose, in the case of di- or poly-carboxylic acid di- or poly-halides, it is of advantage to use monamines. As such monamines there may be used practically all the diazotizable amines hereinbefore mentioned, and also amines which are in some cases less suitable as diazo-compounds, such as 1- or 2-aminonaphthalene, 2-aminobenzthiazoles or amino-diphenylene oxides, and aminochrysene or amino-pyrene.

The present process is of special importance for reacting reactive derivatives of mono-carboxylic acids with amines containing more than one amino group, especially diamines. As diamines there may be mentioned cyclic diamines, for example mono-nuclear diamines such as 1:4-diamino-benzene, 1:4-diamino-2:5-dialkoxy-benzenes or 1:4-diamino-benzenes of which the 2- and 5-positions are occupied by different substituents, such as nitro groups, halogen atoms, alkoxy groups and alkyl groups.

In many cases valuable results are also obtained by using bi- or poly-nuclear amines, for example, benzidine and its derivatives such, for example, as 3:3'-dichloro-, 3:3'-dimethyl-, 3:3'-diethyl- or 3:3'-dialkoxy-benzidines, 3:5:3':5'-tetrachloro-benzidene or 3:5:3':5'-tetramethyl-benzidine. In many cases valuable dyestuffs are also obtained by using diamines of the benzene series in which two identical or different benzene nuclei are linked together by a suitable bridge member, for example, by oxygen, or an —$SO_2$— group, as in the case, for example, of 4:4' - diamino - diphenyl - sulfone, 3:3' - diamino-4:4' - dichloro - diphenyl - sulfone, 3:3' - diamino - 4:4'-dimethoxy-diphenyl-sulfone, or a —CO— group as in the case, for example, of 3:3'-diamino-diphenyl-ketone, 3:3'-diamino - 4:4' - dichloro - diphenyl - ketone, 3:3' - diamino - 4:4' - dimethoxy - diphenyl - ketone, or a —$CH_2$— group as in the case, for example, of 3:3'-diamino-diphenyl - methane, 3:3' - diamino - 4:4' - dichloro - diphenyl - methane, 4:4' - diamino - 3:3' - dichloro - diphenyl - methane, 4:4' - diamino - 3:5:3':5' - tetrachloro - diphenyl - methane, or the groups —NHCO—,

—NHCONH—, —$SO_2$NH—, —CH=CH—

—CH$_2$—CH$_2$—, —HN—OC—C$_2$H$_4$—CO—, —NH— or —N=N—. Finally there come into consideration diamines of quite a different kind, for example, 2:8-diamino-chrysene, 2:6- or 1:5-diamino-naphthalene, or 2:6-diamino-benzthiazoles such as 2-(4'-aminophenyl)-6-amino-benzthiazole.

There may also be used monamines or diamines containing secondary amino groups, advantageously N-alkyl-arylamines or di-(N-alkylamino)-aryl-compounds such as 4:4'-di-(methylamino)-diphenyl or 4:4'-di-(methylamino)-diphenyl-sulfone.

The condensation of the carboxylic acid halides described above with the amines is advantageously conducted in a substantially anhydrous medium. Under these conditions the condensation generally proceeds surprisingly easily even at temperatures within the range of the boiling points of normal organic solvents such as toluene, monochlorobenzene, dichlorobenzene, trichlorobenzene, nitrobenzene and the like. In order to accelerate the reaction it is generally desirable to use an acid-binding agent such as anhydrous sodium acetate, pyridine or anhydrous ammonia. The dyestuffs so obtained are in part crystalline and in part amorphous, and are generally obtained in a very good yield and in a pure state. It may be of advantage, in order to produce especially pure dyestuffs, first to isolate the acid chlorides obtained from the carboxylic acids, and if desired, to recrystallize the acid chlorides. In some cases, however, the isolation of the acid chloride may be dispensed with without any harmful effects, and in some cases even with an improvement in the result, and the condensation carried out immediately following the preparation of the acid chloride.

Some of the simple dyestuffs obtainable by the process of the invention have already been made by coupling diazo-compounds with appropriate coupling components. It is surprising that such dyestuffs, when made by the process of this invention, are in general not only of substantially better purity, for example, free from decomposition products of diazo-compounds and non-coupled coupling components, but are also in a different physical form which renders the products well suited for use as pigments. Thus, for example, it is practically impossible to couple satisfactorily condensation products of 2 molecular proportions of 2:3-hydroxynaphthoic acid and a diamine, especially mono-nuclear and high molecular diamines, in substance with 2 molecular proportions of a diazo-component, whereas by the present process it is easy to prepare dyestuffs having relatively large molecules by reacting 2 molecular proportions of the same or different mono-carboxylic acid derivatives containing azo groups with such diamines. Moreover, the dyestuffs obtained by the present process, which are in part known, from mono-carboxylic acids containing azo groups and monamines possess more favorable properties as pigments, especially for incorporation, for example, by rolling in polyvinyl-compounds such as polyvinyl foils, than the corresponding dyestuffs obtained by the coupling method.

Among the new dyestuffs obtainable by the present process, that is to say, among those which have not been made by the known process, that is to say, by coupling diazo-compounds with azo-components, such that one of the starting materials contains a carboxylic acid amide group, the following groups are of special interest:

(a) Acid amide derivatives of azo-dyestuffs which are free from sulfonic acid groups and correspond to the general formula

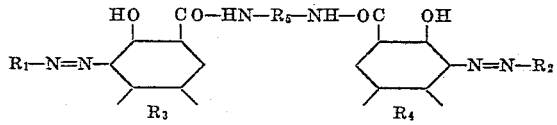

in which R$_1$ and R$_2$ each represent the radical of a diazo-component, R$_3$ and R$_4$ each represent a fused radical connected to the benzene ring at the places indicated by the valency bonds and containing three fused rings including the benzene ring shown in the formula, and —HN—R$_5$—HN— represents the radical of a non-vattable diamine.

(b) Acid amide derivatives of azo-dyestuffs which are free from sulfonic acid groups and correspond to the general formula.

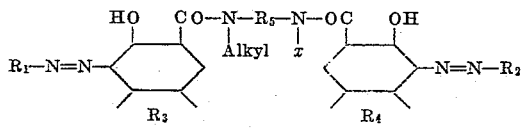

in which R$_1$ and R$_2$ each represent the radical of a diazo-component, R$_3$ and R$_4$ each represent a cyclic radical fused to the benzene ring at the places indicated by valency bonds, and

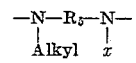

represent the radical of a non-vattable diamine, $x$ representing hydrogen or an alkyl group.

(c) Acid amide derivatives of azo-dyestuffs which are free from sulfonic acid groups and correspond to the general formula

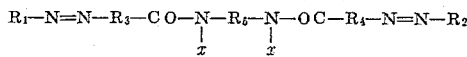

in which R$_1$ and R$_2$ each represent the radical of a diazo-component, R$_3$—CO— and R$_4$—CO— each represent the radical of an azo-component containing a hydroxyl group and bound to the azo linkage in a position vicinal to the hydroxyl group, $x$ represents a hydrogen atom or an alkyl group and

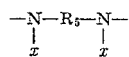

represents the radical of a non-vattable diamine, and in which at least one of the radicals R$_3$ and R$_4$ contains as a hydroxyl group an enolizable keto group, and in which the —CO-groups in the formula are separated from the azo linkages by more than one carbon atom.

(d) Acid amide derivatives of azo-dyestuffs which are free from sulfonic acid groups and correspond to the general formula

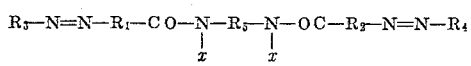

in which R$_1$ and R$_2$ each represent the radical of a diazo-component, R$_3$ and R$_4$ each represent the radical of an azo-component containing a hydroxyl group in a position vicinal to the azo linkage, $x$ represents a hydrogen atom or an alkyl group and

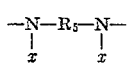

represents the radical of a non-vattable diamine.

(e) Acid amide derivatives of azo-dyestuffs which are free from sulfonic acid groups and correspond to the general formula

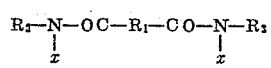

in which —OC—R$_1$—OC— represents the radical of a dicarboxylic acid containing an azo linkage and having the constitution HOOC—R$_1$—COOH, in which the carboxyl groups are separated from the azo group by more than one carbon atom, and which contain a hydroxyl group in a position vicinal to the azo linkage, x represents a hydrogen atom or an alkyl group, and

and

each represent the radical of a non-vattable monamine.

The pigments, defined under (a) to (e), and not only these, but in general the pigments obtainable by the process of the invention and especially by the reaction of monocarboxylic acid halides with diamines, above all those of the formula

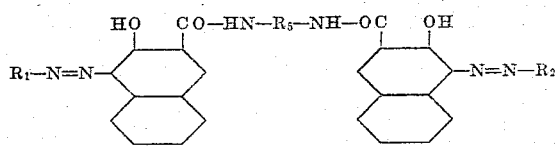

in which $R_1$ and $R_2$ each represent the radical of a diazo-component and —HN—$R_5$—NH— the radical of a non-vattable diamine, are as a rule distinguished by an especially good fastness to migration and also by their temperature resistance and fastness to solvents. These properties are valuable above all for so-called pigment printing, that is to say, printing processes which depend on fixing pigments by means of suitable adhesives, such as casein, hardenable plastics, especially urea-formaldehyde or melamine-formaldehyde condensation products, polyvinyl chloride or polyvinyl acetate solutions or emulsions or other emulsions (for example, oil-in-water or water-in-oil emulsions) on a substratum, especially on textile fibers but also on other flat shaped structures such as paper (for example wall papers) or fabrics made of glass fibers. The pigments obtainable by the present process can also be used for other purposes, for example, in a finely dispersed form for dyeing artificial silk made of viscose or cellulose ethers or esters or superpolyamides or superpolyurethanes in the spinning solution, and also serve well in the manufacture of colored lakes or lake formers, solutions and products made of acetyl cellulose, nitrocellulose, natural resins or artificial resins such as polymerization or condensation resins, for example, aminoplasts, phenoplasts, polystyrene, polyethylene, polyacryl, rubber, casein, silicones and silicone resins. They can also be used with advantage in the manufacture of colored pencils, cosmetic preparations and laminated plates.

By virtue of the especially favorable physical form in which the products of the invention are generally obtained, and owing to their chemical inertness and good temperature resistance, they can usually be dispersed easily in masses or preparations of the aforesaid kind, and advantageously at a stage at which these masses or preparations have not yet reached their final shape. The operations necessary for shaping, such as spinning, pressing, hardening, casting, sticking, can then be carried out without difficulty in the presence of the pigments of this invention, without any chemical reactions of the substratum such as further polymerizations, condensations, etc., being inhibited.

The products obtainable by the invention, insofar as they are not derived from coupling components which owe their capacity for coupling to enolizable keto groups, can be converted by esterification of the hydroxyl groups with components imparting solubility into printing preparations.

The following examples illustrate the invention, the parts and percentages being by weight unless otherwise stated, and the relationship of parts by weight to parts by volume being the same as that of the kilogram to the liter.

*Example 1*

183 parts of the dyestuff from diazotized 5-nitro-2-amino-1-methoxy-benzene and 2:3-hydroxynaphthoic acid are suspended in 3600 parts by volume of chlorobenzene and the whole is heated at the boil while distilling off any water that may be still present. As soon as the chlorobenzene has become clear, the whole is cooled to about 70° C., 75 parts of thionyl chloride are added, and the whole is then boiled under reflux until appreciable quantities of hydrochloric acid are no longer evolved. This is the case in about 5 hours. The whole is then filtered while hot and allowed to cool. The precipitated crystals having a dark bronze lustre and consisting of the acid chloride of the formula

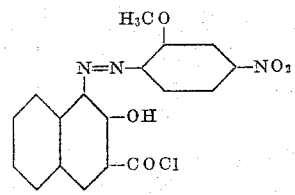

are separated by filtering with suction, washed with chlorobenzene, and dried in vacuo at 60–65° C. The product melts at 253° C. with slow decomposition (uncorrected).

21.5 parts of the chloride so obtained are boiled under reflux for 22 hours with 400 parts by volume of anhydrous chlorobenzene, 10 parts by volume of pyridine and 5.3 parts of 3:3′-dimethyl-4:4′-diamino-diphenyl, the whole is filtered while hot, the filter residue is washed with about 100 parts by volume of hot chlorobenzene until the chlorobenzene solution is almost colorless, and the product is dried in vacuo at 80–90° C.

The resulting dyestuff of the formula

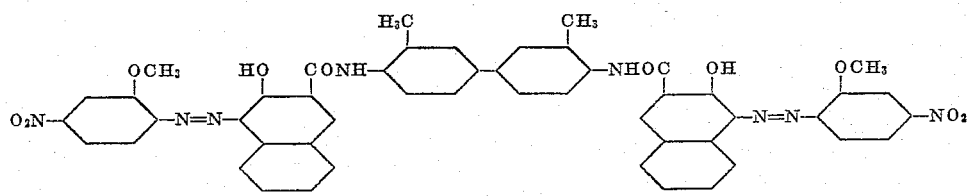

is a dark Bordeaux red powder, which dissolves in concentrated sulfuric acid with a violet-blue coloration. When incorporated in artificial masses, especially in polyvinyl chloride, it produces a powerful reddish-violet coloration. The coloration in polyvinyl chloride is very fast to migration.

Instead of pyridine there may be used as an acid-binding agent 5 parts of anhydrous sodium acetate.

*Example 2*

34.0 parts of the azo-dyestuff from diazotized 1-amino-2 - methyl - 4 - chlorobenzene and 2:3 - hydroxynaphthoic acid are stirred in 300 parts of benzene, and 48 parts of phosphorus pentabromide are added in portions in the course of one hour, the temperature being maintained at 40° C. by cooling with ice water. The whole is then stirred for a further 2 hours at 50° C., and then overnight at 20° C., and carboxylic acid bromide is separated by filtering with suction. It is washed with benzene and dried in vacuo at 80° C. The acid bromide melts at 182–184° C. with slow decomposition. When recrystallized from anhydrous chlorobenzene it melts at 185° C. with slow decomposition.

17.1 parts of the resulting acid bromide are mixed in 120 parts of chlorobenzene while stirring at 90° C. with a solution of 3.68 parts of 4:4'-diamino-diphenyl in 20 parts of chlorobenzene and 5 parts of anhydrous pyridine and heated at a gentle boil for 10 hours. It is then filtered while hot, the filter residue is washed with hot chlorobenzene, and dried at 90° C. in vacuo. There are obtained 17 parts of a soft granular red powder, which dissolves in concentrated sulfuric acid with a ruby-red coloration and colors polyvinyl chloride pure bluish-red tints. The coloration is very fast to migration and light.

By using instead of 4:4'-diamino-diphenyl, 3.16 parts of 1:5-diamino-naphthalene, there is obtained a pigment which colors polyvinyl chloride foils an even more bluish-red tint. The colorings are also distinguished by very good fastness to migration and light.

*Example 3*

52.1 parts of the finely pulverized sodium salt of the dyestuff from diazotized 1-amino-2:5-diethoxy-4-benzoyl-amino-benzene and 2:3-hydroxynaphthoic acid are introduced in portions, while stirring, into a mixture of 500 parts of benzene and 25 parts of thionyl chloride. The temperature rises from 24° C. to 37° C. The reaction is then allowed to continue for a further 5 hours at 30–35° C., and the acid chloride is separated by filtration and dried in vacuo at 60° C. After recrystallization from benzene it melts at 224° C. with slow decomposition.

20.7 parts of the resulting acid chloride are stirred with 200 parts of nitrobenzene and 10 parts of anhydrous pyridine, and the whole is heated to 130° C. The solution of 3.68 parts of 4:4'-diamino-diphenyl in 20 parts of warm nitrobenzene is poured into the mixture, and the whole is maintained at 138–140° C. for about 15 hours. The whole is then allowed to cool to 80° C., filtered to separate the blue pigment, and the latter is washed well with nitrobenzene heated at 80° C. The nitrobenzene itself is washed out of the pigment with a little benzene and the pigment is dried in vacuo at 80° C. When the pigment is used for coloring artificial masses, especially polyvinyl chloride, there is obtained a strong pure blue coloration having very good fastness to migration.

*Example 4*

27.3 parts of the azo-dyestuff from diazotized 1-amino-2-methoxy-4-benzoylamino-5-methylbenzene and 2:3-hydroxynaphthoic acid are stirred in 180 parts of ortho-dichlorobenzene. 13.2 parts of thionyl chloride are poured in and the whole is heated for one hour at 130° C. A warm solution of 5.52 parts of 4:4'-diamino-diphenyl in 30 parts of ortho-dichlorobenzene and 5 parts of anhydrous pyridine is slowly poured into the clear solution, and the temperature is maintained at 130° C. for 15 hours. The precipitated pigment is separated by filtration, washed well at 100° C. with ortho-dichlorobenzene, and dried in vacuo at 80–90° C. It is a soft-grained violet powder which colors polyvinyl chloride strong violet tints. Its fastness to migration is very good.

By using 1-amino-2:5-dimethoxy-4-benzoylamino-benzene or 1-amino-2:5-diethoxy-4-benzoylamino-benzene as diazo-component, instead of 1-amino-2-methoxy-4-benzoylamino-5-methylbenzene, there are obtained under the same conditions reddish or neutral blue colorations of equally good fastness to migration.

By using, instead of 4:4'-diamino-diphenyl, 3:3'-dichloro-4:4'-diamino-diphenyl there are obtained more reddish colorations and with 3:3'-dimethyl-4:4'-diamino-diphenyl greener colorations. Instead of 4:4'-diamino-diphenyl there may be used also 4-methylamino- or 4-ethylamino-4'-aminodiphenyl.

*Example 5*

32.65 parts of the azo-dyestuff from diazotized ortho-chloraniline and 2:3-hydroxynaphthoic acid are stirred in 250 parts of ortho-dichlorobenzene. 13.2 parts of thionyl chloride are poured in, and the whole is heated at 130° C. for one hour, while stirring. A warm solution of 9.2 parts of 4:4'-diamino-diphenyl in 100 parts of ortho-dichlorobenzene is poured in, and the whole is stirred for a further 5 hours at 120–130° C. A slow current of dry ammonia gas is passed in until a test portion gives a neutral reaction when stirred with water. The whole is filtered, the pigment is washed with ortho-dichlorobenzene at 100° C., and dried in vacuo at 90° C. There is obtained a soft orange powder which colors polyvinyl chloride a pure reddish orange tint.

*Example 6*

23.4 parts of the azo-dyestuff from diazotized 1-amino-2-methyl-5-chlorobenzene and 2-hydroxyanthracene-3-carboxylic acid are heated in 180 parts of chlorobenzene and 16.8 parts of thionyl chloride for one hour at 130° C. Into the clear solution is poured in the form of a thin stream a warm solution of 5.25 parts of 4:4'-diamino-diphenyl in 30 parts of chlorobenzene and 5 parts of anhydrous pyridine, and the temperature is maintained at 120–130° C. for 15 hours. The whole is filtered, and the pigment is washed with hot chlorobenzene and dried in vacuo at 90° C.

It is a soft-grained dark powder which colors polyvinyl chloride pure violet tints of very good fastness to migration.

Similar pigments are obtained, when instead of 4:4'-diamino-diphenyl an equivalent quantity of 4-methylamino- or 4-ethylamino-4-amino-diphenyl or of 4:4'-di-(methylamino)- or 4:4'-di-(ethylamino)-diphenyl is used.

By using 1:5-diamino-naphthalene as the base for the condensation, a pigment yielding bluish violet tints is obtained.

*Example 7*

23.2 parts of the azo-dyestuff from diazotized 1-amino-2:5-dimethoxy-4-chlorobenzene and 2:3-hydroxynaphthoic acid are heated in 140 parts of nitrobenzene with 13.2 parts of thionyl chloride for 1½ hours at 120–130° C. A warm solution of 6.36 parts of 4:4'-diamino-3:3'-dimethyl-diphenyl in 20 parts of nitrobenzene and 5 parts of pyridine is poured in, and the temperature is maintained at 120–130° C. for 15 hours. Dry ammonia gas is then passed in until a test portion shaken with water shows a neutral reaction, the pigment is separated by filtration and washed at 80° C. with hot nitrobenzene. The nitrobenzene is washed out of the product by means of chlorobenzene, and the resulting fine powder is dried in vacuo at 90° C.

It colors polyvinyl chloride deep violet tints of very good fastness to migration.

In the table given below are set out further acid amide derivatives of azo-dyestuffs which are obtained by condensing in the manner described above 2 molecular proportions of the azo-dyestuff from the diazo-component given in column I and the azo-component given in column II, with the diamine given in column III. The condensation is advantageously carried out in the solvent mentioned in column IV.

|  | I<br>Diazo-component | II<br>Azo-component | III<br>Diamine | IV<br>Solvent | Color of material colored with the dyestuff |
|---|---|---|---|---|---|
| 1 | 1-amino-2-methoxy-5-chlorobenzene | 2:3-hydroxynaphthoic-acid | 1:4-diamino-2:5-diethoxybenzene | chlorobenzene | bluish red. |
| 2 | do | do | 4:4'-diamino-3:3'-dimethoxydiphenyl | do | Do. |
| 3 | do | do | 4:4'-diamino-diphenylsulfone | do | pure red. |
| 4 | do | do | 4:4'-diamino-3:3'-dichlorodiphenyl | do | brownish red. |
| 5 | do | do | 3:3'-diamino-4:4'-dichlorobenzophenone | do | reddish orange. |
| 6 | do | do | 4:4'-diamino-3:3'-dichlorodiphenylmethane | do | bluish red. |
| 7 | 1-amino-2-chlorobenzene | do | 4:4'-diamino-3:3'-dichlorodiphenyl | do | orange. |
| 8 | 1-amino-3-chlorobenzene | do | 4:4'-diamino-diphenyl | do | scarlet. |
| 9 | do | do | 4:4'-diamino-3:3'-dichlorodiphenyl | o-dichlorobenzene | Do. |
| 10 | do | do | 2:8-diamino-chrysene | nitrobenzene | brown. |
| 11 | 1-amino-2:5-dichlorobenzene | do | 4:4'-diamino-3:3'-dimethyldiphenyl | chlorobenzene | neutral red. |
| 12 | do | do | 1:4-diamino-2:5-diethoxybenzene | do | yellowish brown. |
| 13 | do | do | 4:4'-diamino-3:3'-dimethoxydiphenyl | do | neutral red. |
| 14 | do | do | 4:4'-diamino-3:3'-dichlorodiphenyl | do | yellowish red. |
| 15 | do | do | 3:3'-diamino-4:4'-dichlorodiphenylmethane | do | yellowish orange. |
| 16 | do | do | 4:4'-diamino-3:3'-dichlorodiphenylmethane | o-dichlorobenzene | yellowish scarlet. |
| 17 | do | do | 1:4-diamino-benzene | Chlorobenzene | neutral red. |
| 18 | do | do | :4-diamino-2-methyl-5-methoxybenzene | do | Do. |
| 19 | 4-chloro-2-amino-2-diphenylether | do | 4:4'diaminodiphenyl | Nitrobenzene | bluish red. |
| 20 | 4:4'-dichloro-2-aminodiphenylether | do | 4:4'-diaminodiphenyl ether | Chlorobenzene | scarlet. |
| 21 | 1-amino-2-methyl-3-chlorobenzene | do | 4:4'-diaminodiphenyl | do | Do. |
| 22 | do | do | 1:4-diamino-2:5-dichlorobenzene | Nitrobenzene | yellow scarlet. |
| 23 | do | do | 3:3'-diaminodiphenylene oxide | do | violetish brown. |
| 24 | 1-amino-2-nitro-4-chlorobenzene | do | 4:4'-diamino-diphenyl | Chlorobenzene | maroon. |
| 25 | do | do | 4:4'-diamino-1:1'-azobenzene | do | Do. |
| 26 | 1-amino-2-methyl-4-chlorobenzene | do | 4:4'-diamino-3:3'-dimethyl-diphenyl | o-dichlorobenzene | ruby. |
| 27 | do | do | 4:4'-diaminodiphenyl ether | chlorobenzene | yellowish red. |
| 28 | 1-amino-2-methyl-3-chlorobenzene | do | N:N'-dimethyl-4:4'-diaminodiphenyl | do | brownish red. |
| 29 | do | do | N:N'-dimethyl-4:4'-diaminodiphenylsulfone | do | orange. |
| 30 | 1-amino-2-methyl-5-chlorobenzene | do | 4:4'-diaminodiphenyl | o-dichlorobenzene | red. |
| 31 | do | do | 1:5-naphthylenediamine | do | bluish red. |
| 32 | do | do | 1:4-diamino-2:5-dichlorobenzene | Nitrobenzene | Do. |
| 33 | 1-amino-2-methyl-4-nitrobenzene | do | 4:4'-diamino-3:3'-dichlorodiphenyl | do | Do. |
| 34 | 1-amino-2-chloro-5-trifluormethylbenzene | do | do | do | orange. |
| 35 | 2-amino-1:1'-diphenyl-sulfone | do | 4:4'-diamino-diphenylsulfone | do | scarlet. |
| 36 | 1-amino-2-methoxy-4-chloro-5-methylbenzene | do | 4:4'-diaminodiphenyl | Chlorobenzene | bordeaux. |
| 37 | do | do | 4:4'-diamino-3:3'-dichlorodiphenyl | do | reddish bordeaux. |
| 38 | 1-amino-2:5-dimethoxy-4-chlorobenzene | do | do | o-dichlorobenzene | violet. |
| 39 | do | do | 4:4'-diaminodiphenyl | Nitrobenzene | Do. |
| 40 | 1-amino-2-methyl-5-chlorobenzene | 2:3-hydroxyanthracenecarboxylic acid | do | Chlorobenzene | reddish violet. |
| 41 | do | do | 1:5-diaminonaphthalene | do | violet. |
| 42 | 1-amino-2-methyl-4-chlorobenzene | 2:3-hydroxydiphenylenehydroxycarboxylic acid | 4:4'-diaminodiphenyl | o-dichlorobenzene | olive. |
| 43 | 1-amino-2-methyl-5-chlorobenzene | do | do | do | Do. |
| 44 | do | do | 1:5-diaminonaphthalene | do | blackish olive. |
| 45 | 1-amino-2-methyl-4-chlorobenzene | 2:3-hydroxycarbazolecarboxylic acid | 4:4'-diamino-3:3'-dichlorodiphenyl | do | brown. |
| 46 | do | do | 4:4'-diamino-3:3'-dimethyldiphenyl | do | Do. |
| 47 | do | do | 4:4'-diamino-3:3'-dimethoxydiphenyl | do | yellowish brown. |
| 48 | do | do | 1:5-diaminonaphthalene | do | brown. |
| 49 | 1-amino-3-chlorobenzene | do | 4:4'-diaminodiphenyl | do | yellowish olive. |
| 50 | do | do | 4:4'-diamino-3:3'-dimethyldiphenyl | do | Do. |
| 51 | 1-amino-2-methyl-4-nitrobenzene | do | 4:4'-diaminodephenyl | do | violetish brown. |
| 52 | do | do | 1:5'-diaminonaphthalene | do | Do. |
| 53 | 1-amino-2-methyl-4-chlorobenzene | 9-methyl-2-hydroxycarbazole-3-carboxylic acid | 4:4'-diaminodiphenyl | Nitrobenzene | violetish black. |
| 54 | do | do | 1:5-diaminonaphthalene | do | Do. |

*Example 8*

34 parts of the azo-dyestuff from diazotized 1-amino-2-methyl-3-chlorobenzene and 2:3-hydroxynaphthoic acid are heated in 300 parts of ortho-dichlorobenzene and 15.5 parts of thionyl chloride for one hour while stirring under reflux at 130° C. A solution of 9.2 parts of 4:4'-diamino-diphenyl in 90 parts of ortho-dichlorobenzene and 5 parts of anhydrous pyridine are poured in, and the whole is stirred for a further hour. There are then poured in a solution prepared as described above of the acid chloride from 49.9 parts of the azo-dyestuff from diazotized 1-amino-2:5-diethoxy-4-benzoylamino-benzene and 2:3-hydroxynaphthoic acid, and the whole is stirred for a short time longer and mixed with a solution of 9.2 parts of 4:4'-diamino-diphenyl in 90 parts of ortho-dichlorobenzene and 10 parts of anhydrous pyridine. The temperature is maintained at 120° C. for 15 hours, the pigment is separated by filtration and washed well with ortho-dichlorobenzene having a temperature of 80° C. The product is dried at 90° C. There is obtained a violet powder which dissolves in concentrated sulfuric acid with a blue coloration and colours polyvinyl chloride foils strong violet tints. The coloration possesses very good fastness to migration.

*Example 9*

29.2 parts of the dyestuff from diazotized para-aminobenzoic acid and 2-hydroxynaphthalene are boiled in 500 parts of chlorobenzene until water no longer passes over. The whole is allowed to cool to about 55° C. and 23.8 parts of thionyl chloride are added in the course of 15 minutes. The whole is heated for about one hour at 80–90° C., and then at the boil for 3 hours, that is to say, until the evolution of hydrochloric acid or sulfur dioxide subsides. The whole is allowed to cool until the internal temperature is 80–90° C., and a filtered, dry solution of 9.6 parts of 3:3'-dimethyl-4:4'-diamino-diphenyl in 200 parts of chlorobenzene is added. The whole is heated for 4 hours, that is to say, at the boil until the splitting off of hydrogen chloride has subsided. The precipitated dyestuff pigment is separated by filtering with suction, while hot, and the filter residue is washed with warm chlorobenzene solution and then with hot ethyl alcohol. The washed dyestuff of the formula

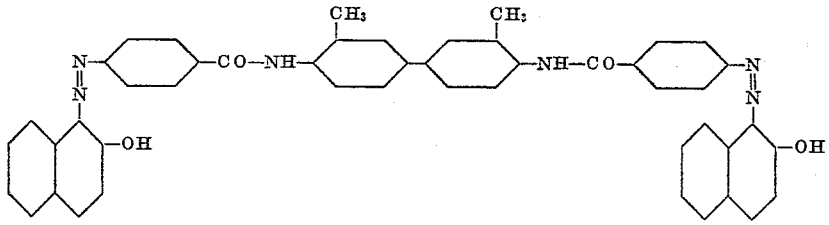

is dried at 80–90° C. The dyestuff is a fine orange powder which dissolved in concentrated sulfuric acid with a bluish violet coloration and colours artificial materials, above all polyvinyl chloride, orange tints which are fast to migration. In pigment printing processes there are obtained prints which are fast to solvents.

Similar pigments are obtained when the 3:3'-dimethyl-4:4'-diamino-diphenyl is replaced by an equivalent quantity of the following diamines: 4-methylamino-4'-amino-diphenyl, 4-ethylamino-4'-amino-diphenyl, 4:4'-di-(methylamino)-diphenyl, 4:4'-di-(ethylamino)-diphenyl.

*Example 10*

29.2 parts of the dry dyestuff from diazotized para-amino-benzoic acid and 2-hydroxynaphthalene are stirred in 250 parts of benzene at ordinary temperature. At this temperature 23.0 parts of phosphorus pentachloride are introduced in the course of 30 minutes. The temperature rises from about 20° C. to 30° C. The whole is stirred for a few hours longer and heated at 40–50° C. The whole is allowed to cool, the resulting acid chloride of the dyestuff is separated by filtering with suction and washed with a small amount of benzene. The acid chloride is dried in vacuo at 60° C.

The acid chloride of the formula

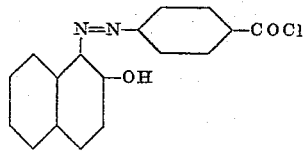

obtained in this manner is condensed in the manner described in Example 9 with 9.6 parts of 3:3'-dimethyl-4:4'-diamino-diphenyl and worked up. The dyestuff corresponds to that of Example 9.

By esterification in pyridine with metabenzoic acid sulfochloride the pigment can be converted into a product suitable for printing.

Other valuable acid amide derivatives of azo-dyestuffs which can be made by the method described above are set out in the table given below.

| | I Diazo-component | II Azo-component | III Diamine | IV Solvent | Colour of material coloured with the dyestuff |
|---|---|---|---|---|---|
| 1 | 1-amino-4-chlorobenzene-3-carboxylic acid. | 2-hydroxynaphthalene. | 4:4'-diamino-3:3'-dimethyl-diphenyl. | Chlorobenzene. | orange. |
| 2 | ----do---- | ----do---- | 4:4'-diamino-3:3'-dichloro-diphenyl. | ----do---- | Do. |
| 3 | 1-aminobenzene-4-carboxylic acid. | ----do---- | ----do---- | ----do---- | scarlet. |
| 4 | 1-aminobenzene-4-carboxylic acid. | ----do---- | 4:4'-diamino-diphenyl. | ----do---- | yellowish orange. |
| 5 | ----do---- | ----do---- | 4:4'-diamino-3:3'-dimethoxy-diphenyl. | ----do---- | brownish red. |
| 6 | 4-[4'-aminobenzoyl]-aminobenzoic acid. | ----do---- | 4:4'-diamino-3:3'-dichloro-diphenyl. | ----do---- | yellow orange. |
| 7 | 1-amino-2-nitrobenzene-4-carboxylic acid. | ----do---- | 4:4'-diaminodiphenyl. | ----do---- | reddish brown. |
| 8 | 1-amino-4-nitrobenzene-3-carboxylic acid. | ----do---- | 1:4-diaminobenzene. | ----do---- | brown. |
| 9 | 2-amino-4-methyl-1:1'-diphenyl-sulfone-4'-carboxylic acid. | ----do---- | ----do---- | ----do---- | orange. |
| 10 | ----do---- | ----do---- | 4:4'-diamino-3:3'-dimethyl-diphenyl. | ----do---- | yellowish orange. |
| 11 | ----do---- | ----do---- | 4:4'-diamino-3:3'-dichloro-diphenyl. | ----do---- | reddish yellow. |
| 12 | 1-amino-2-chlorobenzene-5-carboxylic acid. | ----do---- | 4:4'-diamino-3:3'-dimethyl-diphenyl. | ----do---- | reddish orange. |
| 13 | ----do---- | ----do---- | 4:4'-diamino-3:3'-dimethoxy-diphenyl. | ----do---- | yellowish brown. |
| 14 | ----do---- | ----do---- | 1:4-diamino-benzene. | ----do---- | brown. |
| 15 | 1-amino-2-methoxy-5-chlorobenzene (2 Mol). | Resorcylic acid (1 Mol). | 4:4'-diamino-3:3'-dimethyl-diphenyl. | ----do---- | Do. |
| 16 | 4-amino-2-methoxy-6-methyl-2'-chloro-1:1'-azobenzene-4'-carboxylic acid. | 2-hydroxynaphthalene. | ----do---- | ----do---- | bordeaux. |
| 17 | 1-amino-2-chlorobenzene-5-carboxylic acid. | 9-methyl-2-hydroxycarbazole. | 4:4'-diamino-3:3'-dichloro-diphenyl. | o-dichlorobenzene. | yellowish brown. |

*Example 11*

35.7 parts of the dry dyestuff from diazotized ortho-chloraniline and 1-phenyl-3-methyl-5-pyrazolone-4'-carboxylic acid of the formula

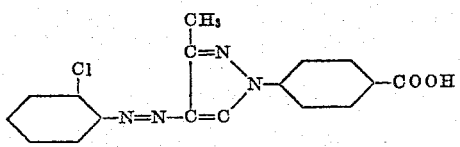

are stirred in 300 parts of benzene and mixed at room temperature with 23.0 parts of phosphorus pentachloride. The evolution of hydrogen chloride sets in rapidly, and the formation of the acid chloride is completed after about 4 hours by heating at 60° C. The whole is cooled, the precipitated acid chloride of the azo-dyestuff is separated by filtering with suction, and it is washed with some benzene and dried at 60° C. in vacuo.

37.5 parts of the acid chloride so obtained are condensed in the manner described in Example 10 by boiling in 800 parts of chlorobenzene with 10.6 parts of 3:3'-dimethyl-4:4'-diamino-diphenyl. The resulting dyestuff of the formula

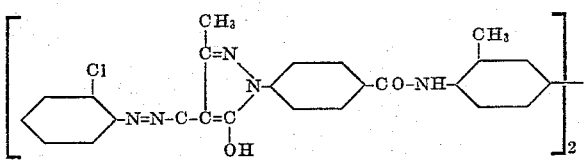

which precipitates almost quantitatively is separated by filtering with suction while hot, and the filter residue

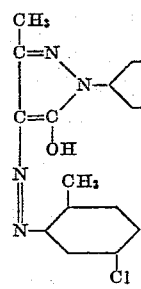

is washed with warm chlorobenzene and then with hot ethyl alcohol. The dyestuff is a yellow powder which dissolves in concentrated sulfuric acid with a yellow coloration and colours artificial materials, especially polyvinyl compounds, yellow tints which are fast to migration.

*Example 12*

37 parts of the dyestuff prepared in the usual manner from 1-amino-2-methyl-5-chlorobenzene and 1-phenyl-3-methyl-5-pyrazolone-4'-carboxylic acid of the formula

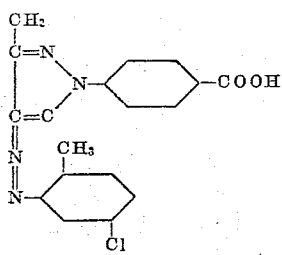

are stirred in 500 parts of chlorobenzene. 16.5 parts of thionyl chloride are added and the whole is heated at the gentle boil for 6 hours. The whole is cooled to about 10° C., and filtered after the dyestuff acid chloride has precipitated, and the filter residue is washed with a small amount of cold chlorobenzene and dried in vacuo at 60–70° C. The resulting dyestuff acid chloride of the formula

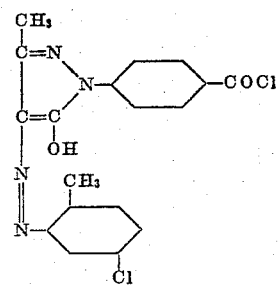

is a yellow powder which melts at 233–234° C. after recrystallisation from chlorobenzene.

38.3 parts of the dyestuff acid chloride so obtained are stirred with 800 parts of chlorobenzene and 10 parts of pyridine. 13.4 parts of 4:4'-diamino-3:3'-dichloro-diphenyl-methane are added and the whole is heated at the boil for 12 hours under reflux. Instead of adding pyridine, dry ammonia may be introduced as an acid-binding agent. The whole is cooled to about 100° C., filtered with suction at that temperature, and the filter residue is washed with warm chlorobenzene until the washings are almost colourless. The pigment is dried at 70–80° C. in vacuo, if desired, after it has been further washed with warm alcohol.

The resulting dyestuff pigment of the formula

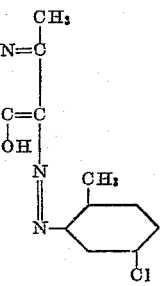

is a yellow powder which dissolves in concentrated sulfuric acid with a yellow-orange coloration and is insoluble or extremely sparingly soluble in the usual organic solvents.

Valuable yellow azo-dyestuffs containing carboxylic acid amide groups are also obtained by reacting in the manner described above two molecular proportions of the dyestuff carboxylic acid chloride with one molecular proportion of 4:4'-diamino-diphenyl-sulfone, 4:4'-diamino-diphenyl, 4-methylamino-4'-amino-diphenyl, 4-ethylamino-4'-amino-diphenyl, 4:4'-di-(methylamino)-diphenyl, 4:4'-di-(ethylamino)-diphenyl or 3:3'-dichloro-4:4'-diamino-diphenyl. A further yellow azo-dyestuff derivative is obtained by condensing one molecular proportion of 3:3'-dimethyl-4:4'-diamino-diphenyl with two molecular proportions of the acid chloride of the dyestuff from diazotized 1-amino-2-chlorobenzene and 1-phenyl-3-methyl-5-pyrazolone-4'-carboxylic acid.

*Example 13*

33.6 parts of the dyestuff prepared in the usual manner from diazotized para-amino-benzoic acid and 1-(4'-methyl)-phenyl-3-methyl-5-pyrazolone of the formula

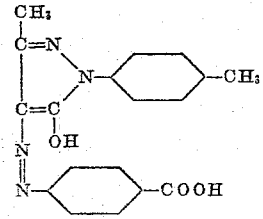

are stirred in 400 parts of chlorobenzene. 16.5 parts of thionyl chloride are added and the whole is heated at the gentle boil for 6 hours under reflux. The whole is cooled externally to about 10° C., and after a short time the dyestuff acid chloride formed is separated by filtering with suction, washed with a small amount of cold chlorobenzene, and dried in vacuo at 60–70° C. The resulting dyestuff acid chloride of the formula

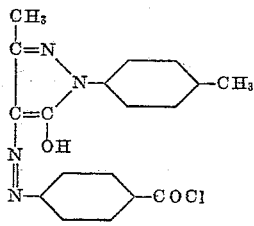

is an orange powder, which after recrystallisation from chlorobenzene melts at 176–177° C. 35.5 parts of the dyestuff acid chloride of the above formula are stirred with 800 parts of chlorobenzene and 10 parts of pyridine. 12.6 parts of 3:3'-dichloro-4:4'-diamino-diphenyl are added and the whole is heated at the boil for 12 hours under reflux.

The whole is allowed to cool to 90–100° C., the precipitated dyestuff pigment is separated by filtering with suction at that temperature, and the filter cake is washed with hot chlorobenzene at about 100° C. until the washings are colourless. The pigment may then be further washed on the filter with hot alcohol, and then dried in vacuo at 70–80° C. The resulting dyestuff pigment of the formula

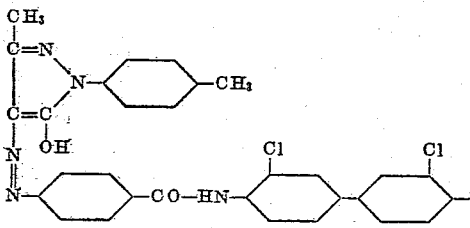

is an orange powder which dissolves in concentrated sulfuric acid with an orange coloration and is insoluble or very sparingly soluble in the usual organic solvents. The dyestuff pigment may also be prepared without separating the dyestuff acid chloride.

The resulting dyestuff pigment colours artificial materials, for example, polyvinyl chloride foils yellow tints which are fast to light and migration. It can also be used for the manufacture of lakes fast to subsequent spray coating, for coloring all kinds of plastics, and, if desired, also for colouring artificial fibers in the spinning mass after having been converted into a very finely dispersed form.

Similar dyestuff can be obtained by using as diazo-components other aminocarboxylic acids such, for example, as meta-aminobenzoic acid, 4-chloro-3-aminobenzoic acid, 3-amino-4-methoxybenzene-1-carboxylic acid, aminophenoxy-acetic acid, 3- or 4-aminophenyl-acetic acid 3-chloro- or 3-bromo-4-aminophenyl-acetic acid.

Valuable yellow pigments are also obtained by converting in the manner described above the dyestuff from diazotized para-aminobenzoic acid and 1-phenyl-3-methyl-5-pyrazolone or 1-(2'-chloro)-phenyl-3-methyl-5-pyrazolone into its acid chloride, and condensing the latter with 3:3'-dichloro-4:4'-diamino-diphenyl.

*Example 14*

22.1 parts of 4-acetoacetyl-aminobenzoic acid, obtained by condensing para-aminobenzoic acid with diketene in a neutral aqueous solution (and melting at 174° C.), are dissolved with 5 parts of sodium carbonate in 300 parts of water to give a neutral solution. 25 parts of crystalline sodium acetate are added, and a diazo solution, obtained by diazotizing 15.2 parts of 2-nitro-4-methyl-aniline, are run in at 5–10° C. In order to complete the formation of dyestuff the whole is stirred for 4 hours at 5–10° C., and then heated up to 40–45° C. in the course of one hour. The precipitated yellow azo-dyestuff is separated by filtration, washed with water and dried in vacuo at 80–90° C.

38.4 parts of the resulting dyestuff acid are suspended in 400 parts of dry chlorobenzene. The mixture is heated up to 110° C. while stirring, and at that temperature 13.8 parts of thionyl chloride are introduced dropwise in the course of 15 minutes. The mixture is then boiled under reflux until all the dyestuff has dissolved and until hydrochloric acid is no longer evolved, which requires about 6–7 hours. Upon cooling, the carboxylic acid chloride crystallises in lustrous yellow crystals. The mixture is cooled to 10° C., filtered, and the filter residue is washed with benzene. After being dried the chloride is obtained in the form of a yellow crystalline powder (melting at 245° C.). It dissolves in hot benzene, toluene, chlorobenzene, etc., without leaving any residue. It corresponds to the formula

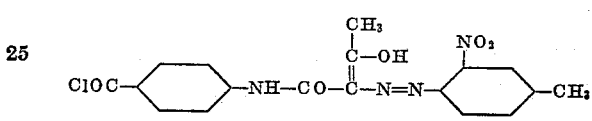

10.5 parts of 3:3'-dimethyl-4:4'-diamino-diphenyl are dissolved in 200 parts of dry chlorobenzene, and 40.3 parts of the dyestuff acid chloride obtained as described above are introduced at 80–85° C. while stirring. The condensation product separates instantaneously in the form of a

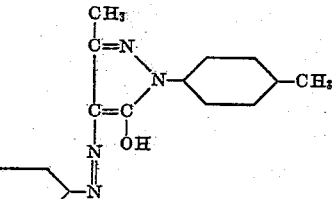

yellow precipitate. The mixture is then heated at 110° C. until hydrochloric acid is no longer evolved and until a test portion applied to filter paper gives a colorless outer zone of the blot. The whole is then allowed to cool to 80° C. and filtered. The filter residue is washed with benzene and dried in vacuo at 60–70° C.

In this manner there is obtained a greenish yellow dyestuff powder, which is practically insoluble in all the usual organic solvents. It dissolves in concentrated sulfuric acid with a yellow coloration.

By incorporating this dyestuff in polyvinyl chloride greenish yellow transparent films can be obtained which have an excellent fastness to migration.

By using in this example, instead of 4-acetoacetyl-aminobenzoic acid as coupling component, 3-acetoacetyl-aminobenzoic acid there is obtained a dyestuff which colours polyvinyl chloride reddish yellow tints having equally good properties.

Similar dyestuffs are obtained, for example, by using as coupling components the acetoacetyl-compounds of 2-aminobenzoic acid, of 5- or 4-chloro-2-aminobenzoic acid, of 6-chloro-2-aminobenzoic acid, of 2-chloro-4-amino-benzoic acid, of 3-amino-4-methoxybenzoic acid and of 2-methoxy-5-aminobenzoic acid.

Further valuable greenish yellow pigments are obtained by condensing in the manner described above 2 molecular proportions of the carboxylic acid chloride of the dyestuff from diazotized 1-amino-2-methoxy-5-chlorobenzene and 1-acetoacetyl-aminobenzene-4-carboxylic acid with one molecular proportion of 3:3'-dichloro-4:4'-diamino-diphenyl or 3:3'-dimethyl-4:4'-diamino-diphenyl.

Example 15

41.8 parts of the dyestuff of the formula

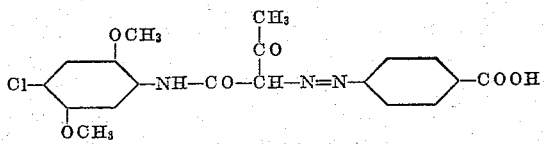

(obtainable by coupling diazotized 4-aminobenzoic acid in an acetic acid or weakly alkaline medium with 4-chloro-2:5-dimethoxy-1-acetoacetyl-aminobenzene) are suspended in 500 parts of dry toluene, and 15 parts of thionyl chloride are introduced dropwise at 100–110° C. Accompanied by a strong evolution of hydrochloric acid the dyestuff gradually dissolves giving a yellow coloration. The whole is heated at 110° C. until hydrochloric acid is no longer envolved and then cooled to 10° C. The dyestuff acid chloride crystallises in handsome yellow-orange crystals. The latter are separated by filtration, washed with some dry ether, and dried in vacuo. The chloride dissolves in hot benzene, toluene, chlorobenzene and glacial acetic acid. When recrystallized from toluene it melts at 248–250° C.

43.7 parts of the dyestuff acid chloride are dissolved in 600 parts of chlorobenzene at 120–130° C., and 10.6 parts of 3:3'-dimethyl-4:4'-diamino-diphenyl are rapidly introduced. The condensation product separates instantaneously in the form of a yellow precipitate. The whole is then raised to the boil until the evolution of hydrochloric acid ceases, which requires about 4–5 hours. The mixture is then filtered while hot, and the filter residue is washed with some hot chlorobenzene and then with alcohol in order to remove the chlorobenzene. After drying the product a yellow powder is obtained, which is insoluble in organic solvents. It dissolves in concentrated sulfuric acid with a yellow coloration.

When incorporated by rolling in polyvinyl chloride strong pure yellow dyeing are obtained, which are completely fast to migration and have a good fastness to light.

Dyestuffs having similar properties are obtained by using in this example, instead of 4-aminobenzoic acid, 3-aminobenzoic acid, 3-amino-4-chlorobenzoic acid, 2-chloro-5-aminobenzoic acid or 3-amino-4-methoxybenzoic acid. It is not necessary to isolate the dyestuff acid chloride, so that the condensation is preferably carried out by neutralizing by the addition of pyridine the hydrochloric acid and also the excess of thionyl chloride present in the toluene solution of the chloride when the splitting off of hydrogen chloride has ceased, and then introducing the base. The final product so obtained has the same properties as those of the product obtained by carrying out the condensation with the isolated chloride.

Example 16

41.85 parts of the dyestuff of the formula

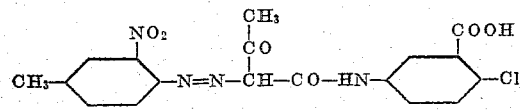

(obtained by coupling 2-nitro-4-methyl-diazo-benzene with 2-chloro-5-acetoacetyl-aminobenzoic acid in an acetic acid solution, the coupling component being obtained by condensing 2-chloro-5-aminobenzoic acid with diketene in neutral aqueous solution) are stirred in 600 parts of chlorobenzene and heated to 110° C. 15 parts of thionyl chloride are then introduced dropwise in the course of one hour, and the whole is then heated at the boil under reflux until the evolution of hydrochloric acid ceases. The dyestuff passes slowly into solution and in a short time the chloride begins to crystallize in handsome yellow lamellae. After cooling to 10° C., the product is separated by filtration and washed with ether. The dyestuff acid chloride is a yellow crystalline powder which dissolves at a raised temperature in benzene, toluene, chlorobenzene and glacial acetic acid. By recrystallisation from chlorobenzene it is obtained in the form of handsome yellow lamellae melting at 204° C.

43.7 parts of the resulting acid chloride are dissolved in 800 parts of chlorobenzene at 120° C., and 10.6 parts of tolidine are added in the form of the free base in one portion while stirring. A thick yellow precipitate separates instantaneously. The whole is heated at the boil under reflux until hydrochloric acid is no longer evolved, which requires about 3–4 hours. The whole is then filtered while hot, and the precipitate is washed with hot chlorobenzene and then with alcohol. After drying there is obtained a fine yellow powder, which is insoluble in organic solvents and dissolves in concentrated sulfuric acid with a yellow coloration. When the product is incorporated by rolling in polyvinyl chloride there are obtained strong greenish yellow colorations, which are fast to migration and have a good fastness to light.

By using in this example, instead of 4-methyl-2-nitraniline, 4-chloro-2-nitraniline, 4-methoxy-2-nitraniline, 2:6-dichloro-4-nitraniline, etc., there are obtained pigment dyestuffs having similar good properties.

Instead of 2-chloro-5-acetoacetyl-aminobenzoic acid there may be used for coupling with the diazotized 1-amino-2-nitro-4-methylbenzene, 4 - acetoacetyl - aminobenzoic acid, 3-acetoacetyl-aminobenzoic acid, 4-chloro-3-acetoacetyl-aminobenzoic acid or 4-methoxy-3-acetoacetyl-aminobenzoic acid.

Example 17

34 parts of the azo-dyesuff from diazotized 1-amino-2-methyl-4-chlorobenzene and 2:3-hydroxynaphthoic acid are stirred in 300 parts of chlorobenzene, 15.5 parts of thionyl chloride are added, and the whole is heated for one hour at the gentle boil. Into the resulting clear solution is poured in the form of a thin stream a solution of 21.7 parts of 3-amino-pyrene in 150 parts of nitrobenzene and 15 parts of anhydrous pyridine. The mixture is maintained at the gentle boil for 16 hours, the pigment is separated by filtering with suction and washed at 80° C. with warm chlorobenzene. It is dried in vacuo. It forms a brown soft-grained powder, which dissolves in concentrated sulfuric acid with a violet coloration and when incorporated by rolling in polyvinyl chloride foils yields reddish violet colorations.

Example 18

33.6 parts of the azo-dyestuff from 1-amino-benzene-4-carboxylic acid and 2:3-hydroxynaphthoic acid are heated in 400 parts of chlorobenzene with 37 parts of thionyl chloride for 1½ hours at the gentle boil. A solution of 54.5 parts of 2-amino-chrysene in 300 parts of chlorobenzene and 42 parts of anhydrous pyridine is then poured in in the form of a thin stream, and the whole is maintained at the gentle boil for a further 15 hours, filtered, and the pigment is washed with chlorobenzene at 80° C. It is red-brown soft-grained powder, which dissolves in concentrated sulfuric acid with a violet coloration and yields brownish red colorations when incorporated by rolling in polyvinyl chloride foils.

Example 19

65 parts of polyvinyl chloride, 35 parts of dioctyl phthalate and 0.2 part of the dyestuff according to the first paragraph of Example 7 are stirred together and the mixture then moved back and forth between the two rolls of a calender for about 3 minutes at 140–145° C. A strongly violet-colored foil of good fastness to light and dyestuff migration is thus obtained.

What is claimed is:

1. Process for the manufacture of acid amide derivatives of azo compounds free from sulfonic acid groups, which comprises condensing in the molecular ratio *m:n* a non-vattable aromatic carbocyclic amine containing $n$ reactive amino groups with a carboxylic acid halide containing $m$ carboxylic acid halide groups, the latter being selected from the group consisting of carboxylic acid chlorides and carboxylic acid bromides, said halide being the halide of a carboxylic acid containing at least one azo-linkage separated from the carboxyl group by more than one carbon atom and a hydroxyl group in a position vicinal to the azo linkage, $m$ and $n$ being whole numbers of at the most 2 and $m \cdot n$ being also at the most 2.

2. Process for the manufacture of acid amide derivatives of azo-compounds free from sulfonic acid groups which comprises condensing with one molecular proportion of a non-vattable aromatic carbocyclic diamine, two molecular proportions of a chloride of a mono-carboxylic acid containing at least one azo-linkage separated from the carboxyl group by more than one carbon atom and a hydroxyl group in a position vicinal to the azo group.

3. Process for the manufacture of acid amide derivatives of azo-compounds free from sulfonic acid groups which comprises condensing in an inert organic solvent and in the presence of an acid binding agent with one molecular proportion of a non-vattable aromatic carbocyclic diamine, two molecular proportions of a chloride of a monocarboxylic acid containing at least one azo-linkage separated from the carboxyl group by more than one carbon atom and a hydroxyl group in a position vicinal to the azo group.

4. Process for the manufacture of acid amide derivatives of azo-compounds free from sulfonic acid groups which comprises condensing in an inert organic solvent and in the presence of an acid binding agent with one molecular proportion of a non-vattable aromatic carbocyclic diamine, two molecular proportions of a monocarboxylic acid chloride of the formula

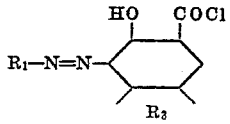

in which $R_1$ represents the radical of a diazo-component and $R_3$ represents a cyclic radical fused to the benzene ring at the places indicated by the valence bonds.

5. Process for the manufacture of acid amide derivatives of azo-compounds free from sulfonic acid groups which comprises condensing in an inert organic solvent and in the presence of an acid binding agent with one molecular proportion of a non-vattable aromatic carbocyclic diamine, two molecular proportions of a monocarboxylic acid chloride of the formula

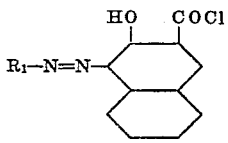

in which $R_1$ represents an aromatic radical of the benzene series.

6. Process for the manufacture of acid amide derivatives of azo-compounds free from sulfonic acid groups which comprises condensing in an inert organic solvent and in the presence of an acid binding agent with one molecular proportion of a non-vattable aromatic carbocyclic diamine, two molecular proportions of a monocarboxylic acid chloride of the formula

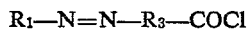

in which $R_1$ represents the radical of a diazo-component and $R_3$—CO— represents the radical of a coupling component bound to the azo group in a position vicinal to an enolized keto group, the —COCl-group being separated from the azo linkage by more than one carbon atom.

7. Process for the manufacure of acid amide derivatives of azo-compounds free from sulfonic acid groups which comprises condensing in an inert organic solvent and in the presence of an acid binding agent with one molecular proportion of a non-vattable aromatic carbocyclic diamine, two molecular proportions of a monocarboxylic acid chloride of the formula

in which $R_1$—CO— represents the radical of a diazo-component and $R_3$ represents the radical of a coupling component bound to the azo group in a position vicinal to a hydroxyl group, the —COCl-group being separated from the azo linkage by more than one carbon atom.

8. Process for the manufacture of an acid amide derivative of an azo compound free from sulfonic acid groups which comprises condensing in an inert organic solvent and in the presence of an acid binding agent with one molecular proportion of 3:3'-dimethyl-4:4'-diamino-diphenyl two molecular proportions of the carboxylic acid chloride of the formula

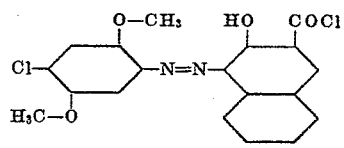

9. Process for the manufacture of an acid amide derivative of an azo compound free from sulfonic acid groups which comprises condensing in an inert organic solvent and in the presence of an acid binding agent with one molecular proportion of 3:3'-dichloro-4:4'-diaminodiphenyl two molecular proportions of the carboxylic acid chloride of the formula

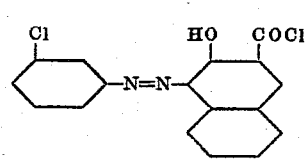

10. Process for the manufacture of an acid amide derivative of an azo compound free from sulfonic acid groups which comprises condensing in an inert organic solvent and in the presence of an acid binding agent with one molecular proportion of 1:5-diaminonaphthalene two molecular proportions of the carboxylic acid chloride of the formula

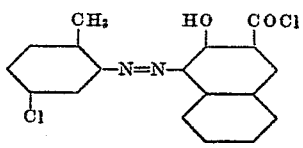

11. Process for the manufacture of an acid amide derivative of an azo compound free from sulfonic acid groups which comprises condensing in an inert organic solvent and in the presence of an acid binding agent with one molecular proportion of 3:3'-dichloro-4:4'-diaminodiphenyl two molecular proportions of the carboxylic acid chloride of the formula

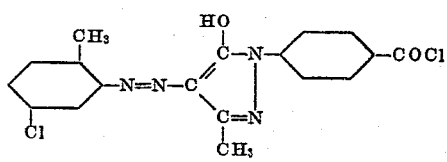

12. Process for the manufacture of an acid amide derivative of an azo compound free from sulfonic acid groups which comprises condensing in an inert organic solvent and in the presence of an acid binding agent with one molecular proportion of 3:3'-dimethyl-4:4'-diamino-diphenyl two molecular proportions of the carboxylic acid chloride of the formula
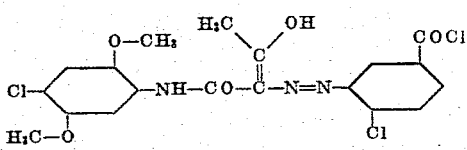
References Cited in the file of this patent
UNITED STATES PATENTS
| | | |
|---|---|---|
| 1,871,513 | Grether | Aug. 16, 1932 |
| 1,882,560 | Glietenberg et al. | Oct. 11, 1932 |
| 2,049,007 | Haller et al. | July 28, 1936 |
| 2,228,455 | Honold | Jan. 14, 1941 |
FOREIGN PATENTS
| | | |
|---|---|---|
| 78,380 | Norway | Apr. 9, 1951 |